United States Patent [19]
Bosse

[11] 3,973,101
[45] Aug. 3, 1976

[54] ELECTRIC AIR HEATING FURNACE

[76] Inventor: André Bosse, 3292 Prieur St. East, Montreal, Quebec, Canada, H1H 2K5

[22] Filed: May 31, 1974

[21] Appl. No.: 475,633

[52] U.S. Cl. .......................... 219/368; 126/110 R; 165/122; 165/126; 219/364; 219/367; 219/370; 219/376
[51] Int. Cl.² .................. H05B 1/02; F24H 3/04
[58] Field of Search ............ 219/364, 365, 366–370, 219/374–376; 165/122, 126; 120/110 R, 110 A

[56] References Cited
UNITED STATES PATENTS

| | | | |
|---|---|---|---|
| 1,534,221 | 4/1925 | Kercher et al. | 219/364 |
| 1,694,351 | 12/1928 | Long | 219/368 X |
| 1,828,810 | 10/1931 | Landis | 219/368 |
| 2,158,602 | 5/1939 | Calhoun | 219/365 x |
| 2,471,784 | 5/1949 | Seifner et al. | 219/370 UX |
| 2,498,054 | 2/1950 | Taylor | 219/364 |
| 2,600,044 | 6/1952 | Ayres et al. | 219/367 |
| 2,721,254 | 10/1955 | Burgess | 219/368 |
| 2,971,076 | 2/1961 | Ferguson | 219/368 X |
| 3,046,380 | 7/1962 | Carlson | 219/364 |
| 3,104,307 | 9/1963 | Garowfalow et al. | 219/368 X |
| 3,575,582 | 4/1971 | Covault | 219/368 |

Primary Examiner—A. Bartis

[57] ABSTRACT

An electric furnace comprised of an outer casing, a support casing and a heater casing, the outer casing has a substantially rectangular cross-section with air inlet openings formed in the lower portion of the back wall and in the upper portion thereof whereas air outlet openings are formed in the lower portion of the front and side walls of the same. The support casing is mounted within and in space relationship with the outer casing and the heater casing is within but spaced from the support casing, both support and heater casings are provided with a circular opening in registry at the upper portion of their back wall. An air propeller is mounted onto the support casing in alignment with the circular openings to blow air from the inlet openings, through the circular openings, along a plurality of elongated electrical heating elements vertically disposed in the heater casing, and outwardly through further openings formed in the bottom of the heater casing, in the lower portion of the support casing and through the outlet openings of the outer casing. Control means are provided to turn the heating elements on in timed sequence. The speed of the propeller can also be automatically increased in direct relation to the number of heating elements turned on. Various safety controls can also be provided.

11 Claims, 8 Drawing Figures

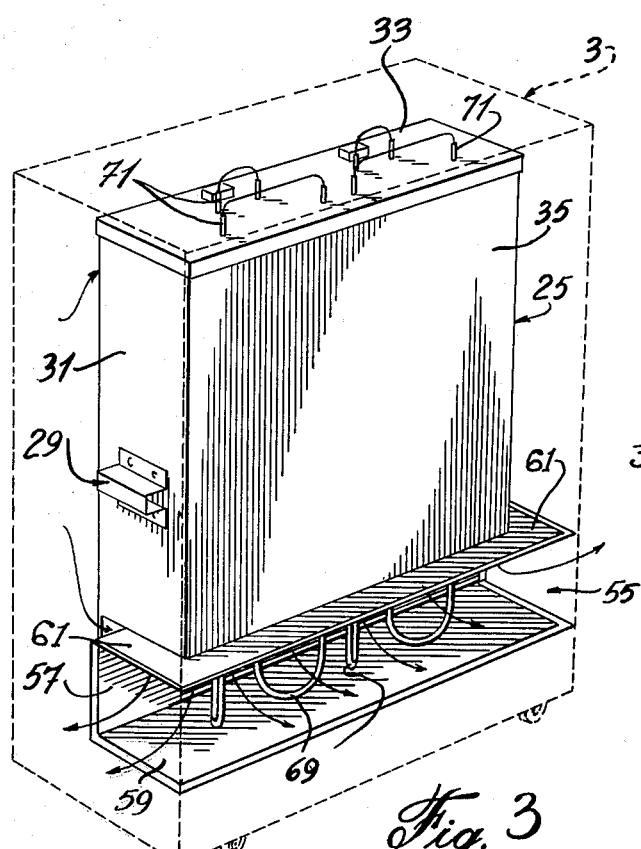
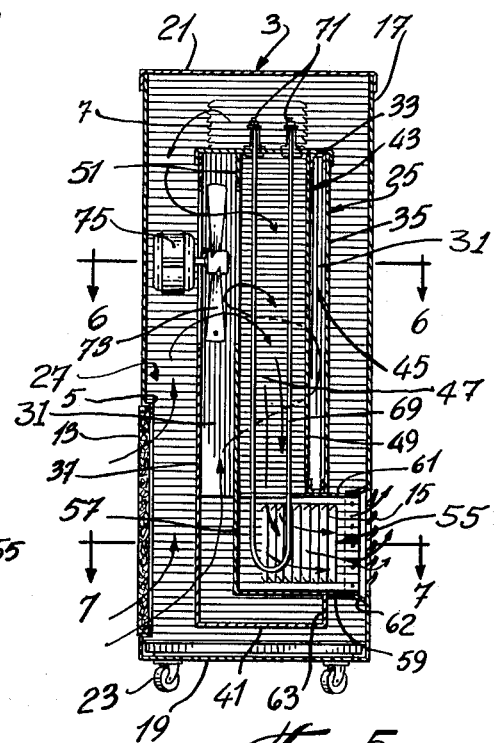
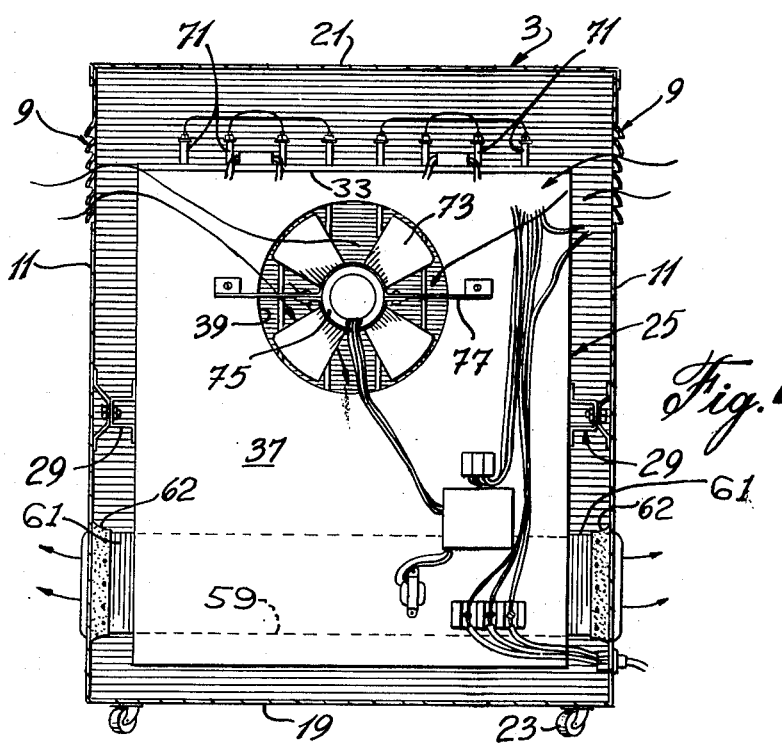

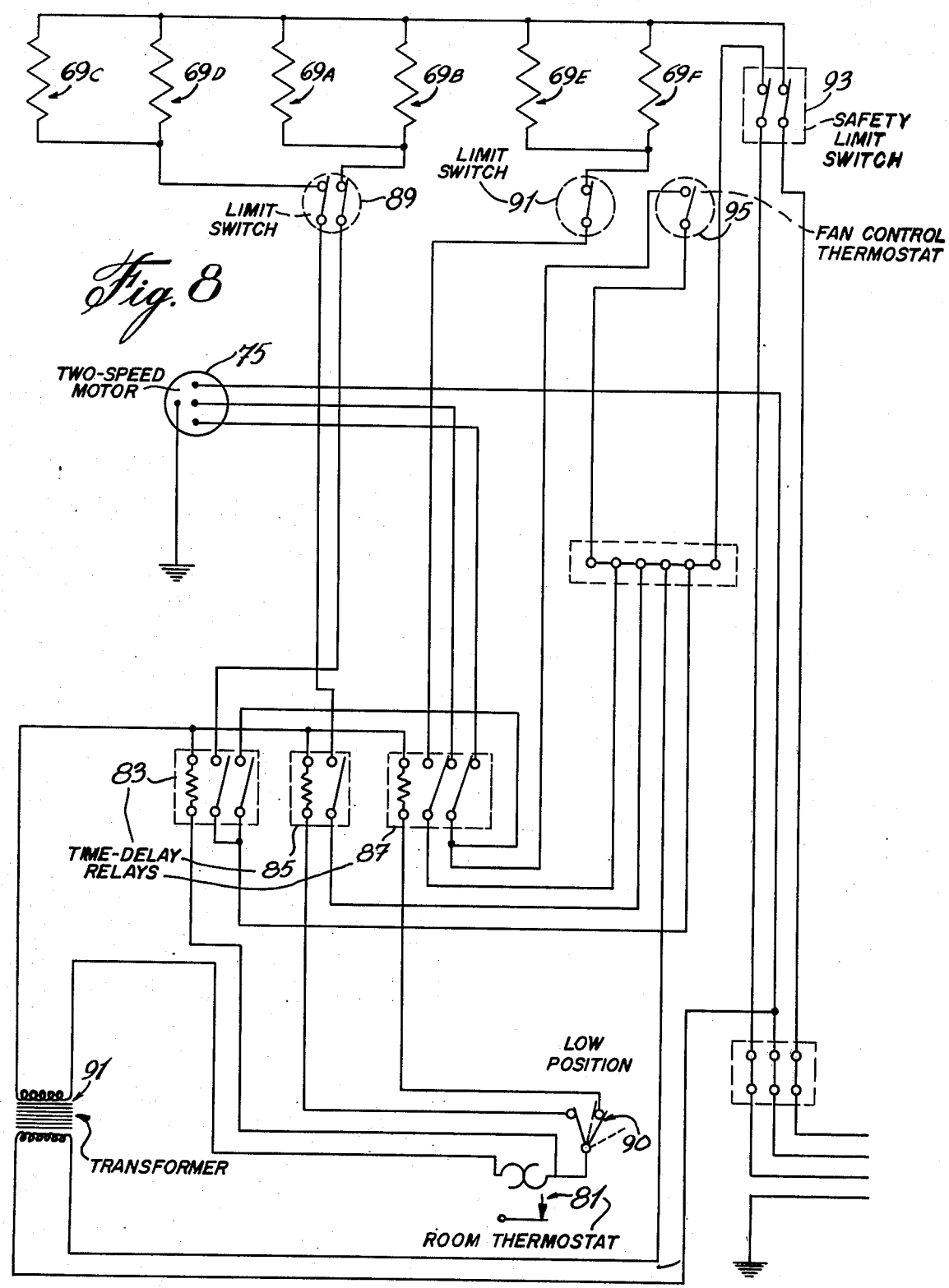

ELECTRIC AIR HEATING FURNACE

BACKGROUND OF THE INVENTION

Field of the Invention

This invention is directed toward an electric furnace.

The electric furnace of the present invention is designed to provide an acceptable alternative to oil space heaters or furnaces in heating small homes, apartments, chalets, or the like. With the cost of heating oil steadily increasing, electric heating has become quite competitive with oil furnaces.

Summary of the Invention

The purpose of the present invention is to provide a space-type, electric furnace which is compact, simple in construction and safe and efficient in operation. The furnace operates by passing air over electric heating elements to heat the air.

The electric furnace of the present invention is constructed to provide a positive, forced flow of air through the furnace in a novel manner which results both in the pre-heating of the air and in maintaining the exterior surface of the furnace cool to the touch. The heated air is then distributed in a substantially uniform, diffused manner from the heater.

Suitable controls are provided for the furnace to energize the heating elements in timed sequence. Preferably, the rate of air flow through the furnace is coordinated with the sequential energizing of the heating elements, so that more air is forced through the furnace as more electric heating elements are brought into operation. This arrangement provides for more efficient and quieter operation.

Other controls are provided to ensure safe operation of the furnace. Suitable controls are provided for example to shut off the furnace if the heated air outlet openings of the furnace become partly or completely blocked.

The invention, in one embodiment, is directed toward an electric furnace having heating elements within a chamber. Fan means are provided for circulating air, from outside the furnace, past the heating elements to heat the air. Means are provided in the furnace for both pre-heating the air and maintaining the outer surface of the furnace cool to the touch during operation.

The invention, in a more specific embodiment, is directed toward an electric furnace having an outer protective casing, a support casing with but spaced from the outer casing, and a heater casing within but spaced from the support casing. Electric heating elements are mounted within the heater casing. Fan means are provided for moving air from outside the outer casing over the outsides of the support and heater casings and then within the heater casing over the heating elements to be heated and back outside the outer casing.

DESCRIPTION OF THE DRAWINGS

The invention will now be described in detail having reference to the accompanying drawings in which:

FIG. 3 is a schematic, front view of the interior of the furnace;

FIG. 4 is a rear view of the interior of the furnace;

FIG. 5 is a vertical, cross-sectional view of the furnace;

FIG. 8 is a wiring diagram for a furnace of six heating elements.

DESCRIPTION OF THE PREFERRED EMBODIMENTS

Figures 1, 2:
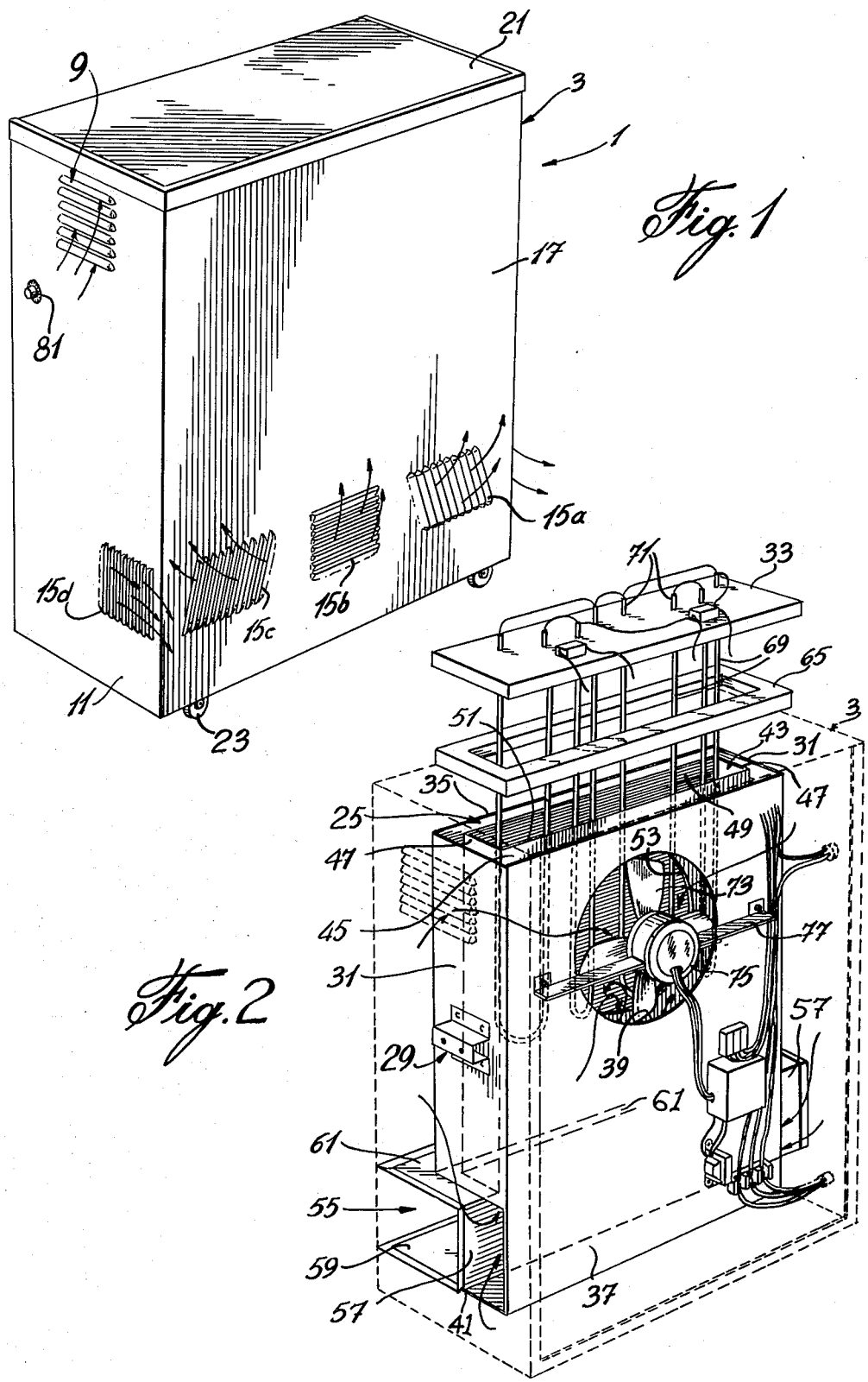
FIG. 1 is a schematic view of the furnace of the present invention.
FIG. 2 is a schematic, exploded, rear view of the interior of the furnace.
Figure 6:
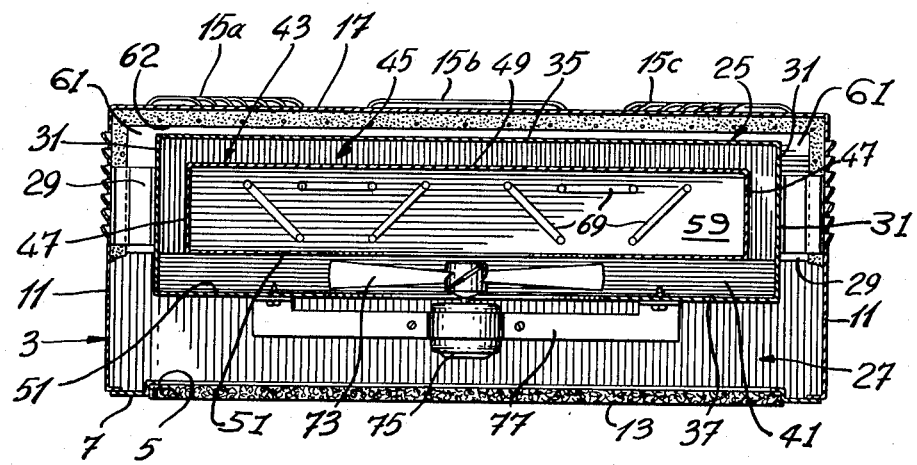
FIG. 6 is a cross-sectional view taken along line 6—6 in FIG. 5.
Figure 7:
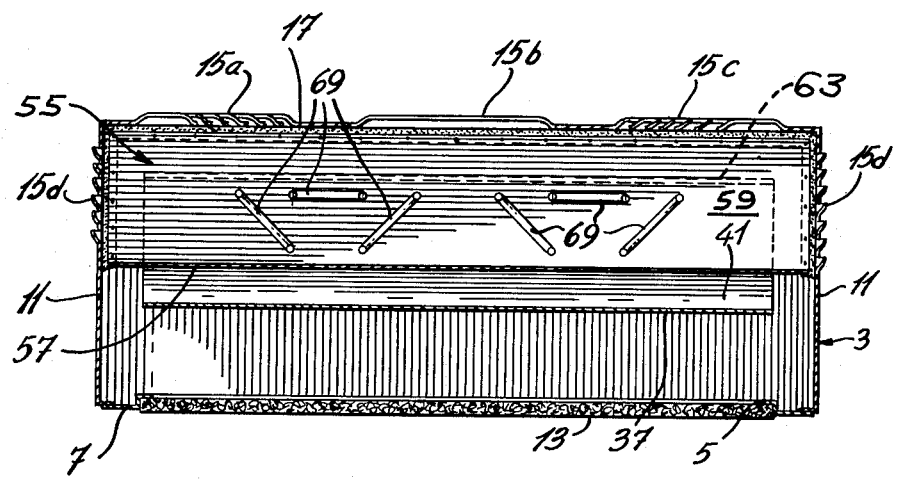
FIG. 7 is a cross-sectional view taken along line 7—7 in FIG. 5.

The electric furnace 1 of the present invention has an outer, protective, decorative casing 3. The casing 3 preferably has a rectangular cross-sectional shape with a large primary air inlet opening 5 in the bottom of the backwall 7 as shown in FIG. 5. Small, slotted secondary air inlet openings 9 can also be provided at the top of the outer casing sidewalls 11 for cooling purposes if desired. A suitable replaceable filter 13 can be mounted in the inlet opening 5 to filter the majority of the air which is to be circulated through the furnace for heating. The outer casing 3 also has slotted, heated air outlets 15 near the bottom of the front wall 17 and near the bottom of the sidewalls 11. Three slotted outlets 15a, 15b, 15c can be provided in a row along the bottom of the front wall 17. The slots in the two outer outlets 15a, 15c in the row are preferably arranged to direct the heated air from the furnace outwardly, to the sides of the furnace, and upwardly, while the slots in center outlet 15b are arranged to direct the heated air upwardly as shown in FIG. 1. One slotted outlet 15d can be provided in each sidewall 11, with the slots arranged to direct heated air forwardly of the furnace as shown in FIG. 1.

The casing 3 is closed with a bottom wall 19 and a removable top wall 21 as shown in FIG. 4. Casters 23 may be mounted on the bottom wall 19 so that the furnace 1 can be easily moved about.

Mounted within the outer casing 3 is a smaller rectangular support casing 25. The support casing 25 is spaced from the outer casing 3 to form an annular channel or duct 27. The support casing 25 is supported in spaced relation with respect to the outer casing 3 by brackets 29 connecting the sidewalls 31 of casing 25 to sidewalls 11 of the outer casing 3. The casing 25 has a closed top wall 33 and a closed front wall 35. The back wall 37 has a circular air inlet opening 39 near the top wall 33. The back wall 37 also extends below the sidewalls 31 and front wall 35 of casing 25 and is turned toward the front wall 35 to form a shelf 41 for reasons to be described.

Mounted within support casing 25 is a rectangular heater chamber or casing 43. Again, casing 43 is mounted within casing 25 to be spaced therefrom forming a vertical annular channel or duct 45. The side walls 47 and front wall 49 of casing 43 are closed. The top of casing 43 is closed by the top wall 33 of support casing 25. Top wall 33 thus also closes the top of duct 45. The back wall 51 of casing 43 has a circular air inlet opening 53 aligned with air inlet opening 39 of casing 25.

An air outlet duct 55 is formed at the bottom of casing 43. This duct 55 forms in integral part of casing 43 and comprises a back wall 57, which is an extension of back wall 51, a bottom wall 59 and a flange 61. Flange 61 extends horizontally out from the bottom of side walls 47 and front wall 49 toward the side walls 11 and front wall 17 of outer casing 3. The horizontal flange 61 is located just above heated air outlets 15 in the front wall and side walls. Back wall 57 also extends out toward the side walls 11, and bottom wall 59 extends out toward both side walls 11 and front wall 17 just below air outlets 15. The sides and the front of duct 55 are preferably connected to the side walls 11 and front wall 17 of outer casing 3 by suitable rubber seal means 62 as shown in FIGS. 4 and 5.

The inner heater casing 43 is supported in spaced relation to support casing 25 in part by resting, through the bottom wall 59 of duct 55, on an upturned lip 63 of shelf 41 as shown in FIG. 5, and in part by attaching flange 61 to front and side wall 31, 35 of casing 25. In addition, a spacer member 65, mounted beneath cover 33 can be used to maintain the tops of the casings 25, 43 in spaced relation to properly define annular duct 45.

A set of electrical heating elements 69, preferably six in number, are suspended from cover 33 within heater casing 45. The elements 69 extend down far enough to project into channel 55 and are mounted within cover 33 by suitable insulating members 71.

A circulating fan 73 is mounted in duct 45 between circular openings 39, 53. The fan 73 is powered by an electric motor 75 mounted by a support 77 attached to back wall 37 of casing 25. Preferably, motor 75 is a two-speed motor.

The operation of the furnace preferably is automatically controlled by a thermostat 81 which in FIG. 8 is shown on the casing but may be installed at a distance on a suitable wall. When the temperature in the space to be heated drops below a predetermined temperature limit, thermostat 81 closes, energizing time-delay relays 83, 85, 87 through a two-position switch 90 and transformer 92. The switch 90 can be placed in a high-heat position or a low-heat position (shown in dashed line). In FIG. 8, the switch 90 is shown in a high-heat position. Relay 83 closes first, after a slight delay of say approximately 20 seconds. When relay 83 closes, heating elements 69A, 69B are energized to begin heating. At the same time, the fan motor 75 is actuated, at low speed, through relay 83 and a normally closed portion of relay 87. Some time later, after say approximately another 20 seconds, relay 85 closes energizing heating elements 69C, 69D. Still later, say after still another 20 seconds, relay 87 closes energizing heating elements 69E, 69F. At the same time, fan motor 75 is now switched over from low speed to high speed operation.

Each group of two heating elements is protected by a suitable temperature limit switch. Heating elements 69A, 69B and 69C, 69D are protected by a double temperature limit switch 89 and heating elements 69E, 69F are protected by a single temperature limit switch 91. Limit switches 89, 91 are set up to operate to shut off the heaters 69 if for any reason the outflow of heated air from the heater is blocked. The limit switches 89, 91 preferably automatically reset. An additional safety limit switch 93 can be provided in the power line. The switch 93 is set to operate to shut off power to the heater if the temperature within heater casing 43 rises above a certain limit, such as 225°F. The switch 93 can either be manually or automatically reset.

When the temperature in the space to be heated rises finally to a desired level, thermostat 81 opens, de-energizing relays 83, 85 and 87 thus shutting off the heaters 69. Fan 73 however keeps operating at low speed via relay 87 until a switch 95, operated when the temperature in the heater drops below a certain value, opens to shut off the motor. The switch 95 automatically resets when the heater has been running again for awhile.

If the two-position switch 90 is on the low-heat position, which may be desirable in the fall or spring, relay 85 is disconnected from the circuit, thus cutting out heaters 69C and 69D. The heater now operates only with heaters 69A, 69B, 69E, and 69F.

During operation of the fan 73, air is brought into the furnace through bottom, back inlet opening 5 and top, side wall openings 9. The incoming air flows through duct 27 about casing 25 toward the fan 73 and openings 39, 53 in the inner casings. This flow of air over casing 25 serves to pre-heat the incoming air and also serves to maintain the outer casing 3 cool to the touch. A portion of the incoming air is also circulated through duct 45 which serves further to keep the outer surface of the furnace cool to the touch and to pre-heat the air. The double ducts 25, 45 provide double pre-heating of the air while maintaining the outer surface of the outer casing cool to the touch.

All the incoming air eventually is blown by fan 73 into heater casing 43 near its top through opening 59 and over the operating heaters 69 within the casing. The inner surface of casing 43 is made of highly reflective material providing intense heating of the air within the casing 43. The heated air eventually flows into outlet duct 55 and out through outlets 15 in the bottom of front wall 17 and side walls 11, to be spread throughout the space to be heated.

I claim:

1. An electric furnace comprising in combination:
   — an outer casing of a substantially rectangular cross-section having top, bottom, front, back and side walls, air inlet openings formed in the lower portion of the back wall and in the upper portion of said outer casing, air outlet openings formed in the lower portion of the front and side walls thereof;
   — an open top support casing having walls substantially parallel to and within said outer casing, an air inlet circular opening and a further air inlet opening being formed in the upper portion and lower portion, respectively, of the back wall of said support casing, the support casing being mounted in spaced relationship with said outer casing;
   — an open top heater casing within but spaced from said support casing and having walls substantially parallel to the support casing walls, an air inlet circular opening in registry with the air inlet circular opening at the upper portion of the support casing being formed in the back wall of said heater casing, air outlet openings being provided at the lower portion of the front and side walls of the heater casing, means extending through the bottom portion of the support casing for communicating the air outlet openings of the heater casing with the air outlet openings of the outer casing;
   — a single cover extending over said support and heater casing;
   — a plurality of elongated electrical heating elements vertically disposed in said heater casing in the air-flow path therethrough, the heating elements being supported at the ends thereof by said cover; and
   — an air propelling means mounted onto said support casing in alignment with the air inlet circular openings provided in the upper portion of the support and heater casings to blow air from said air inlet openings of said outer casing, through said circular air inlet opening and said further opening of said support casing, into the circular air inlet opening of the heater casing and along the heating elements in the heater casing and outwardly through air outlet openings provided at the bottom portion of the heater casing, and then through the communicating means into and through the air outlet openings of the outer casing.

2. An electric furnace as claimed in claim 1, wherein the communicating means comprises a duct means connecting the air outlet openings at the bottom portion of the heater casing with the air outlet openings of the outer casing, and wherein the heating elements are U-shaped.

3. An electric furnace as claimed in claim 2, wherein the duct means forms an integral part of the heater casing, the back wall of the duct means being an extension of the back wall of the heater casing and the duct means having a flange extending horizontally out from the side and front walls of the heater casing toward the front and side walls of the outer casing, respectively, said horizontal flange extending above the air outlet openings of said outer casing.

4. An electric furnace as claimed in claim 3, including seal means for connecting the duct means to the outer casing walls.

5. An electric furnace as claimed in claim 3, wherein the heater casing is mounted in spaced relation to the support casing by means of a member forwardly extending from the back wall of the support casing, said member having an upturned lip at the forend thereof for supporting the duct means, and a spacer member inserted between the support and heater casing walls at the upper portion thereof.

6. An electric furnace as claimed in claim 1, wherein the heating elements are arranged in at least two groups, and control means are provided for turning the groups on in timed sequence.

7. An electric furnace as claimed in claim 6, wherein the air propelling means is operated by an electric motor having at least two speeds, and control means are provided, after the start of operation of the furnace, for increasing the speed of the motor as an additional group of heating elements is turned on.

8. An electric furnace as claimed in claim 7, including means for allowing the air propelling means to operate for a predetermined period of time after the heating elements have been turned off.

9. An electric furnace as claimed in claim 7, including means for selectively actuating only a single group of heating elements.

10. An electric furnace as claimed in claim 7, wherein a temperature limit switch is connected in series with each group of heating elements to shut off the same whenever the temperature inside the heater casing exceeds a predetermined level.

11. An electric furnace as claimed in claim 1, wherein the inner surface of the heater casing is made of a highly reflective material.

* * * * *